United States Patent
Wilson et al.

(10) Patent No.: US 7,804,825 B2
(45) Date of Patent: Sep. 28, 2010

(54) MATRIX EXPANSION LATTICE

(76) Inventors: Kevin Wilson, 21501 Montbury Dr., Lake Forest, CA (US) 92630; Ninh Nguyen, 68 Tavella Pl., Foothill Ranch, CA (US) 92610

( * ) Notice: Subject to any disclaimer, the term of this patent is extended or adjusted under 35 U.S.C. 154(b) by 316 days.

(21) Appl. No.: 11/950,272

(22) Filed: Dec. 4, 2007

(65) Prior Publication Data
US 2008/0151910 A1 Jun. 26, 2008

Related U.S. Application Data

(60) Provisional application No. 60/871,103, filed on Dec. 20, 2006.

(51) Int. Cl.
*H04L 12/50* (2006.01)
(52) U.S. Cl. .................................... 370/367
(58) Field of Classification Search ............... 370/367; 340/2.22
See application file for complete search history.

(56) References Cited

U.S. PATENT DOCUMENTS

| | | | |
|---|---|---|---|
| 3,582,560 A | 6/1971 | Banks et al. | |
| 4,983,961 A | 1/1991 | Brunle et al. | |
| 5,329,520 A | 7/1994 | Richardson | |
| 5,479,608 A | 12/1995 | Richardson | |
| 5,787,085 A | 7/1998 | Fox | |
| 5,790,519 A | 8/1998 | Hanson et al. | |
| 5,982,746 A | 11/1999 | Hanson et al. | |
| 6,069,540 A | 5/2000 | Berenz et al. | |
| 6,335,992 B1 | 1/2002 | Bala et al. | |
| 6,388,359 B1 | 5/2002 | Duelli et al. | |
| 6,535,663 B1 | 3/2003 | Chertkow | |
| 6,653,929 B1 | 11/2003 | Hu et al. | |
| 6,696,917 B1 * | 2/2004 | Heitner et al. | 340/2.22 |
| 6,785,038 B2 | 8/2004 | Hichwa et al. | |
| 6,879,429 B2 | 4/2005 | Wong et al. | |
| 6,904,191 B2 | 6/2005 | Kubby | |
| 6,947,624 B2 | 9/2005 | Kubby | |
| 2005/0117573 A1 * | 6/2005 | Konda | 370/388 |
| 2005/0157713 A1 | 7/2005 | Klausmeier et al. | |
| 2006/0126610 A1 * | 6/2006 | Ryan et al. | 370/388 |
| 2006/0269187 A1 * | 11/2006 | Lin et al. | 385/16 |
| 2008/0143473 A1 * | 6/2008 | Wilson et al. | 340/2.28 |

OTHER PUBLICATIONS

"Adaptive Routing in High-Radix Clos Network—Nov. 2006 IEEE" to Kim et al.*
Jajzczyk, 50 Years of Clos Networks A Survey of Research Issues (online), HPSR 2003 [retrieved on Jun. 6, 2008] retrieved from the internet:<url: http://www.tlc-networks.polito.it/HPSR2003/talks/Clos_HPSR_AJ.pdf> entire document.

(Continued)

*Primary Examiner*—Ayaz R Sheikh
*Assistant Examiner*—Hai-Chang Hsiung
(74) *Attorney, Agent, or Firm*—Greenberg Traurig LLP; Franklin D. Ubell

(57) ABSTRACT

A cross-connect switching system includes a plurality of three stage switching arrays and an expansion switching array, wherein a second stage of each of the three stage switching arrays includes an expansion section comprising switches which facilitate interconnection of each three stage array to the expansion switching array. In one embodiment, the expansion switching array includes a plurality of square arrays, each having Q inputs and Q outputs and wherein the second stages of the three stage arrays each include 1 . . . M+1 . . . M+p vertical stages which connect to the square "D" arrays of the central expansion switching array.

10 Claims, 10 Drawing Sheets

OTHER PUBLICATIONS

Kim et al., Adaptive Routing in High-Radix Clos Network. [online], Nov. 2006 [retrieved on Jun. 6, 2008], retrieved from the internet:<url:http://cva.stanford.edu/publications/2006/SC_adaptive.pdf>. entire document especially the Abstract; Introduction, Fig 1.

Yang, et al., Wide-Sense Nonblocking Clos Networks under Packing Strategy. [online], 1997 [retrieved on Jun. 6, 2008], retrieved from the internet: <url:http://ipdps.cc.gatech.edu/1997/s2/112.pdf.. entire document.

Form PCT/ISA/220; International Search Report in connection with PCT/ US2007/087604 dated Jun. 24, 2008.

Form PCT/ISA/237; Written Opinion of the International Searching Authority in connection with PCT/US2007/087604 dated Jun. 24, 2008.

* cited by examiner

MATRIX EXPANSION LATTICE

RELATED APPLICATIONS

This application claims the Paris Convention priority of U.S. Provisional Application No. 60/871,103 entitled "Matrix Expansion Lattice," filed Dec. 20, 2006, the contents of which are hereby incorporated by reference in their entirety.

FIELD OF INVENTION

The present invention relates in general to telecommunications switching systems and more particularly to a large, efficient and cost effective cross-connect switching architecture.

BACKGROUND OF THE INVENTION

Digital cross-connect systems are an integral part of today's modern telecommunications transport network. They are increasingly used by all service providers including exchange carriers, long distance carriers, and competitive by-pass carriers. Significant technology advancements have allowed digital cross-connect systems to evolve from narrowband grooming and test applications to cross-connect of larger network signals in wideband and broadband frequency domains.

A broadband system is typically used to terminate high speed SONET optical and electrical signals in order to path terminate and groom lower speed broadband signals. The broadband system also supports performance monitoring and test access functions. Typical broadband cross-connect systems use either single stage or three stage Clos matrix architecture. In the three stage matrix architecture, the cross-connect includes switches grouped into an originating stage, a center stage, and a terminating stage. The three stage matrix architecture is best suited for maximum capacity applications for cross-connecting a large volume of signals. The single stage matrix architecture organizes the single stage matrices in rows and columns, which results in a higher number of switches than the three stage architecture.

SUMMARY

While the Clos three stage architecture has been a staple of high capacity cross-connect arrays, the inventors have recognized a need for even higher capacity arrays. Embodiments configured according to invention facilitate providing such capacity. In particular, such embodiments may employ a plurality of three stage switching arrays adapted to interconnect to a central expansion switching array. The second stage of the three stage switching arrays each include an expansion section, which includes switches which facilitate interconnection to the central expansion switching array.

In one embodiment, the expansion switching array includes a plurality of square arrays, which may be referred to as "D" arrays, each having Q inputs and Q outputs. In such an embodiment, the second stages of the three stage arrays may include 1 ... M+1 ... M+p vertical stages. In such case, the M+1 ... M+p vertical stages of the second stages connect to the square "D" arrays of the central expansion switching array.

DETAILED DESCRIPTION

Figure 1:
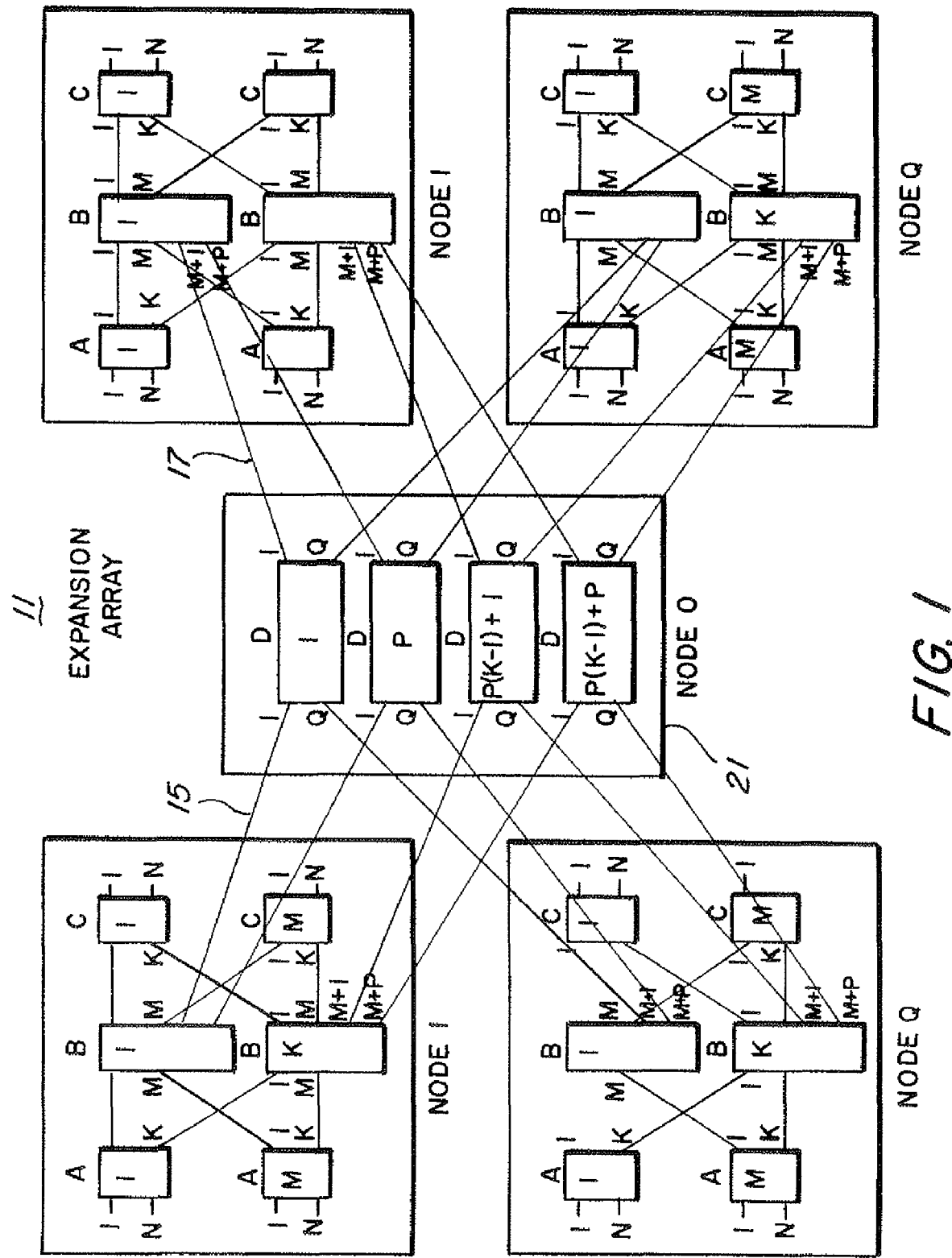
FIG. 1 is a schematic diagram of a switching array according to an illustrative embodiment.

FIG. 1 illustrates a switching array network 11 according to an illustrative embodiment. The system 11 of FIG. 1 is a relatively large system comprising a plurality of Nodes 1 ... Q and an Expansion Array 21 also identified as Node 0. In FIG. 1, each of the nodes e.g. Node 1, is drawn twice, once at the left of Expansion Array 21 and once to the right of the Array 21. This depiction is employed so that the interconnections, e.g. 15, 17, to the Expansion Array from the left and right side of the "B" arrays in each of the nodes do not overlap other portions of the drawing and are therefore more clearly shown.

Each of the Nodes 1 ... Q have a common three stage structure formed of A, B, and C switching arrays, interconnected as shown. The Expansion Array comprises a column of "D" switching arrays. The A, B, C and D arrays are defined as follows:

An array of type A has N inputs and K outputs.
An array of type B has M+P inputs and M+P outputs.
An array of type C has K inputs and N outputs.
An array of type D has Q inputs and Q outputs.

Further with respect to the topology of FIG. 1, it may be observed that Node 1 through Q has only arrays of type A, B and C, while Node 0 has only arrays of type D. As to the number of arrays, there are M arrays of type A in each of node 1 thru node Q, there are K arrays of type B in each of Node 1 thru Node Q, there are M arrays of type C in each of node 1 thru node Q, and there are R arrays of type D in Node 0 where R=K×P. The various arrays may be identified as follows:

$A_{(m)}$ denotes a type A array m in node q where m=1 ... M; and q=1 ... Q.

$B_{(k)}$ denotes a type B array k in node q where k=1 ... K; and q=1 ... Q.

$C_{(m)}$ denotes a type C array m in node q where m=1 ... M; and q=1 ... Q.

$D_{(r)}$ denotes a type D array r in node 0 where r=P(k−1)+p; k=1 ... K; p=1 ... P.

The interconnection of the respective A, B, C and D arrays are defined as follows:

1. Output k of array $A_{(m)}$ in node q connects to input m of array $B_{(k)}$ in the same node q, where m=1 ... M and k=1 ... K.

2. Output air of array $B_{(k)}$ in node q connects to input k of array $C_{(m)}$ in the same node q, where m=1 ... M and k=1 ... K.

3. Output M+p of array $B_{(k)}$ in Node q connects to input q of array $D_{(r=P(k-1)+p)}$ in Node 0, where p=1 ... K; k=1 ... K; and q=1 ... Q.

4. Output q of array $D_{(r=P(k-1)+p)}$ in Node 0 connects to input M+p of array $B_{(k)}$ in Node q, where q=1 . . . Q; k=1 . . . K; and p=1 . . . P.

Thus, it will be observed that outputs M+1 . . . M+p on each left Node B array and inputs M+1 . . . M+p on each right Node B array facilitate implementation of the Expansion Array's type D arrays.

In the switching array of FIG. 1, a switch is a device that may be activated to connect one input to one output of the same array. Each switch is represented by the notation $S_{(node,\ array\ type,\ array\ number,\ input,\ output)}$. For example, $S_{(1,A,2,1,3)}$ denotes the switch that connects input 1 to output 3 of type A array 2 in node 1; $S_{(0,D,3,2,5)}$ denotes the switch that bridges input 2 with output 5 of the type D array 3 in node 0.

Employing the switch notation convention just discussed, the switches of the A, B, C and D arrays are identified as follows:

1. The switch that connects input x to output k of the type A array m in node q is identified by $S_{(q,A,m,x,k)}$, where q=1 . . . Q; m=1 . . . M; x=1 . . . N; k=1 . . . K.
2. The switch that connects input in to output n of the type B array k in node q is identified by $S_{(q,B,k,m,n)}$, where q=1 . . . Q; k=1 . . . K, m=1 . . . M; n=1 . . . M.
3. The switch that connects input k to output y of the type C array m in node q is identified by $S_{(q,C,m,k,y)}$, where q=1 . . . Q; m=1 . . . M; k-1 . . . K; y=1 . . . N.
4. The switch that connects input p to output t of the type D array r in node 0 is identified by $S_{(0,D,r,p,t)}$, where r=1 . . . P(k−1)+p; p=1 . . . P; t=1 . . . P.

Moreover, in the illustrative embodiment of FIG. 1 under discussion, an input of a type A array is also viewed as an input of the network. An output of a type C array is also viewed as an output of the network. The path (continuity) between one network input and one network output (one input of a type A array and one output of a type C array) can be established by serially connecting five switches (S1, S2, S3, S4 and S5) where S1 is a switch that connects an input and output of the $1^{st}$ array of type A; S2 is a switch that connects an input and output of the $2^{nd}$ array of type B; S3 is a switch that connects an input and output of the $3^{rd}$ array of type D; S4 is a switch that connects an input and output of the $4^{th}$ array of type B; and S5 is a switch that connects input and output of the $5^{th}$ (last) array of type C.

As may be appreciated, more than one possible path (more than one set of switches (S1, S2, S3, S4, S5)) exists between any two I/O points in the network. In the illustrative embodiment, the following procedure is used to determine all possible paths (S1, S2, S3, S4, S5) between two I/O points in the network.

First, the following constants are defined:
   Q=number of I/O nodes in the network
   N=number of inputs on each type A array
   N=also number of outputs on each type C array
   K=number of outputs on each type A array
   K=also number of inputs on each type C array
   M=number of local inputs (from type A array) on each type B array
   M=also number of local outputs (to type C array) on each type B array
   P=number of foreign inputs (from type D array) on each type B array
   P=number of foreign outputs (to type D array) on each type B array Next, for a port (X=1 . . . (N×M×Q)), and for (k=1 . . . K), a series of values for variables q, m and n are defined as follows:

$$q = int(X/(N \times M \times Q)) + 1$$

$$m = int(X/(N \times M \times q)) + 1$$

$$n = X - int(X/(q \times m \times N)) \times N$$

In such case, the set of all switches S1, S2, S3, S4, S5 available for interconnecting a selected port "X" with a selected port "Y" within the same Node is determined as follows for (t=1 . . . M) and for a port (Y=1 . . . N):

$$S1 = S_{(q,A,m,n,k)} \quad \text{(Equation 1)}$$

$$S2 = S_{(q,B,k,m,t)} \quad \text{(Equation 2)}$$

$$S3 = S_{(0,D,0,0,0)} \quad \text{(Equation 3)}$$

$$S4 = S_{(q,B,k,m,t)} \quad \text{(Equation 4)}$$

$$S5 = S_{(q,C,t,k,Y)} \quad \text{(Equation 5)}$$

and the set of switches S1, S2, S3, S4, S5 for connecting a port "X" in one Node with a port "Y" in a different Node is determined as follows for (t=1 . . . P), for (h=1 . . . K) and for a port (Y=1 . . . N):

$$S1 = S_{(q,A,m,n,k)} \quad \text{(Equation 6)}$$

$$S2 = S_{(q,B,k,m,t)} \quad \text{(Equation 7)}$$

$$S3 = S_{(0,D,P(k-1)+t,q,w)} \quad \text{(Equation 8)}$$

$$S4 = S_{(w,B,k,t,h)} \quad \text{(Equation 9)}$$

$$S5 = S_{(w,C,h,k,Y)} \quad \text{(Equation 10)}$$

As those skilled in the art will appreciate, a key task in a system such as that illustrated in FIG. 1 is to select the appropriate switches in the Nodes 1 . . . Q and the Expansion Array 21 to complete a desired cross-connect. For example, if it is desired to connect port "1" ("X" Port) of the A array in Node 1 to port "1" ("Y" Port) of the C array in Node 1, appropriate switches in Node 1 (and no switches in Expansion Array 21) must be selected and closed to create the desired signal path. Thus, as noted above, a "path" may comprise a group or set of switches which serially interlink a desired pair of ports ("X" and "Y") through the hardware system.

One approach to accomplishing the switch selection and interconnection task just discussed would be to employ software to determine the appropriate group of switches in real time during operation of the switching array of FIG. 1. This approach creates tremendous software overhead and complexity. According to the preferred embodiment, this approach is avoided by employing software to first create an array of switch identifiers based on the specific, known switching system architecture, which greatly simplifies selection of appropriate switches to create a desired path during real time operation of a deployed system. Thus, such a switch identifier array is preferably determined and stored in the system as part of the system manufacturing process prior to deployment of the system at an end user site. A relatively straight forward indexing operation may then be used to determine those switches which may be closed to achieve a desired interconnection.

Figure 2:
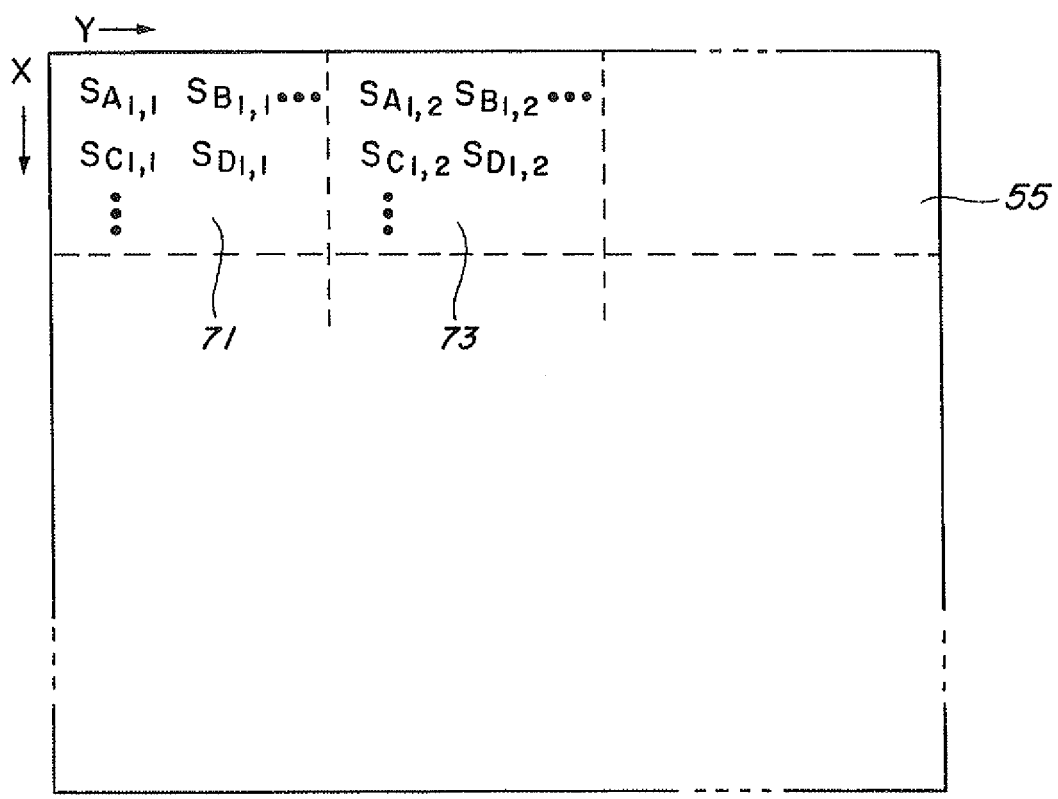
FIG. 2 is a schematic diagram of an array of switch identifiers according to an illustrative embodiment.
Figure 3:
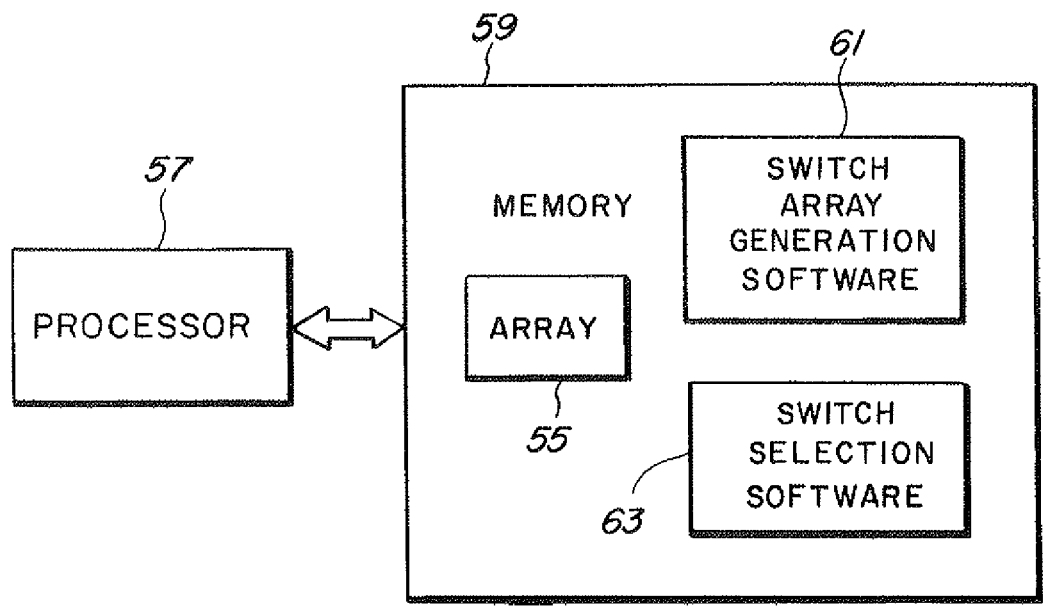
FIG. 3 is a block diagram of a computer processor and associated memory according to an illustrative embodiment.
Figure 4:
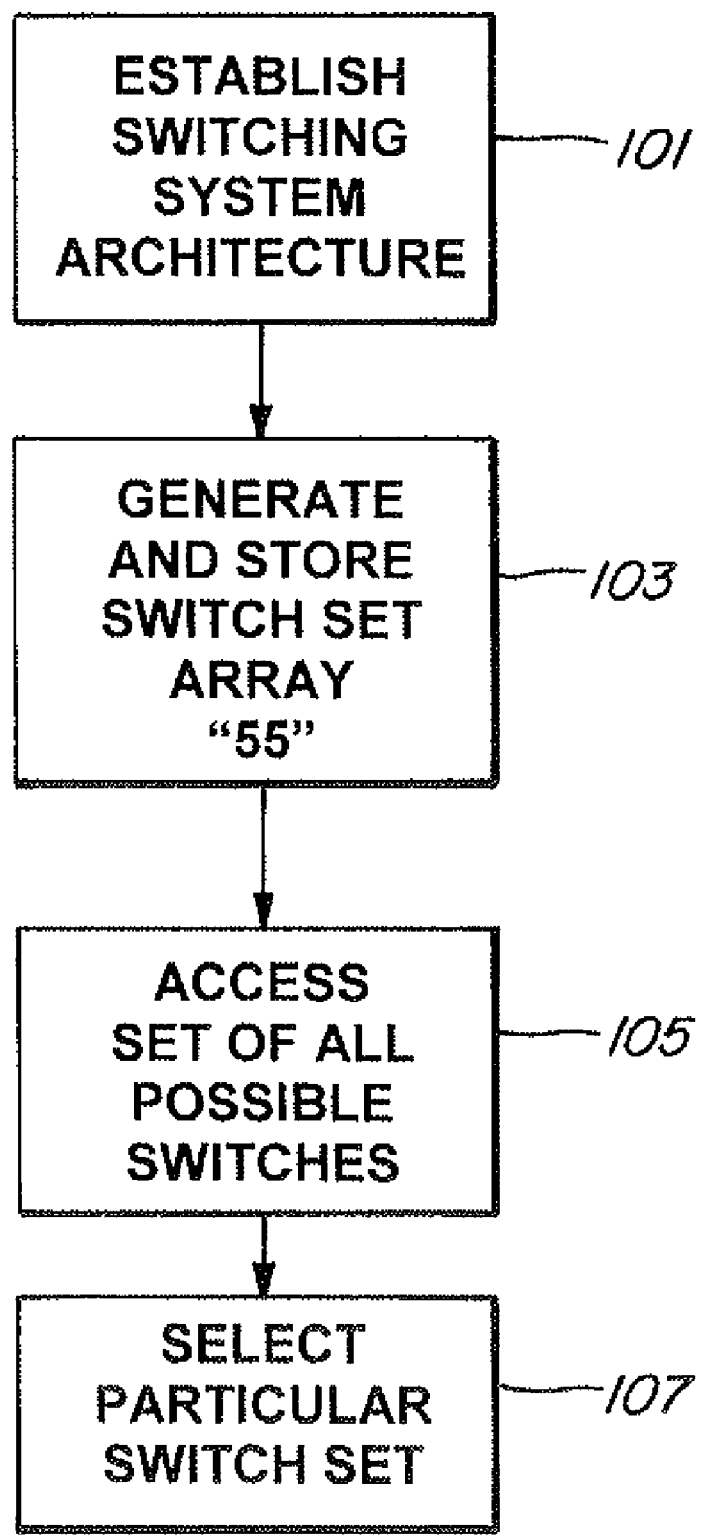
FIG. 4 is a flow diagram of a switch selection process employing the illustrative embodiment.

More particularly, in the illustrative embodiment depicted in FIGS. 2 and 3, and as shown in FIG. 4, after the switching system architecture is established (step 101), software 61 running on a computer processor 57 generates an array 55 of switch identifiers (step 103), and stores the array 55 in memory 59. As shown in FIG. 2, the array 55 is divided into sub-arrays, e.g. 71, 73. Each sub-array contains all sets of switches S1, S2, S3, S4, S5 which are capable of connecting a selected "X" Port to a selected "Y" Port. For example, all switch sets $S_{A(1,1)} \ldots S_{N(1,1)}$ for connecting "X" Port 1 to "Y" Port 1 are stored in sub-array 71, while all switch sets $S_{A(1,2)} \ldots S_{N(1,2)}$ for connecting "X," Port 1 with "Y" Port 2 are stored in sub-array 73, and so forth. Each sub-array is determined by software program steps of software 61, which may, for example, compute either equations 1-5 or equations 6-10 above for the particular port pair (X,Y,) in question. Such software may be written, for example, in C++, or any other suitable language.

Once the array of FIG. 2 has been generated, for example, prior to shipping and deployment of a switching array such as that shown in FIG. 1, the switch selection software 63, which actually selects a particular switch set (such as switch set $S_{A1,1}$) to establish connection between a pair of ports (such as ports 1,1), need only employ an index (e.g. "1,1") during real time operation to access the set 71 of all possible switches for establishing a particular port-to-port connection (step 105, FIG. 4). Thereafter, in step 107 of FIG. 4, for example, the switch selection software may perform a particular switch selection procedure employing various criteria, such as those known to those skilled in the art, for selecting a particular pair of switches from those which are available.

Implementation of a cross-connect switching architecture such as that shown in FIG. 1 may be enhanced in certain embodiments by implementing a switching device activation approach which allows the elimination of a number of discrete drivers by counter driving the coils of parasitic EM devices with pulse modulated electromotive force (EMF) to counteract the sympathetic switching of nearby devices. According to an illustrative embodiment, the EMF duty cycle and polarity applied to the parasitic paths is determined by the tolerance of switching EMF and the proximity of the sympathetic EM device to the targeted device within a matrix array. The result is that the EM devices in the parasitic paths are not switched for either possible initial state and the total number of drivers required for large arrays of EM devices such as, for example, relays and solenoids, is greatly reduced. Implementation of the foregoing approach is illustrated in connection with FIGS. 5-11.

Figure 5:
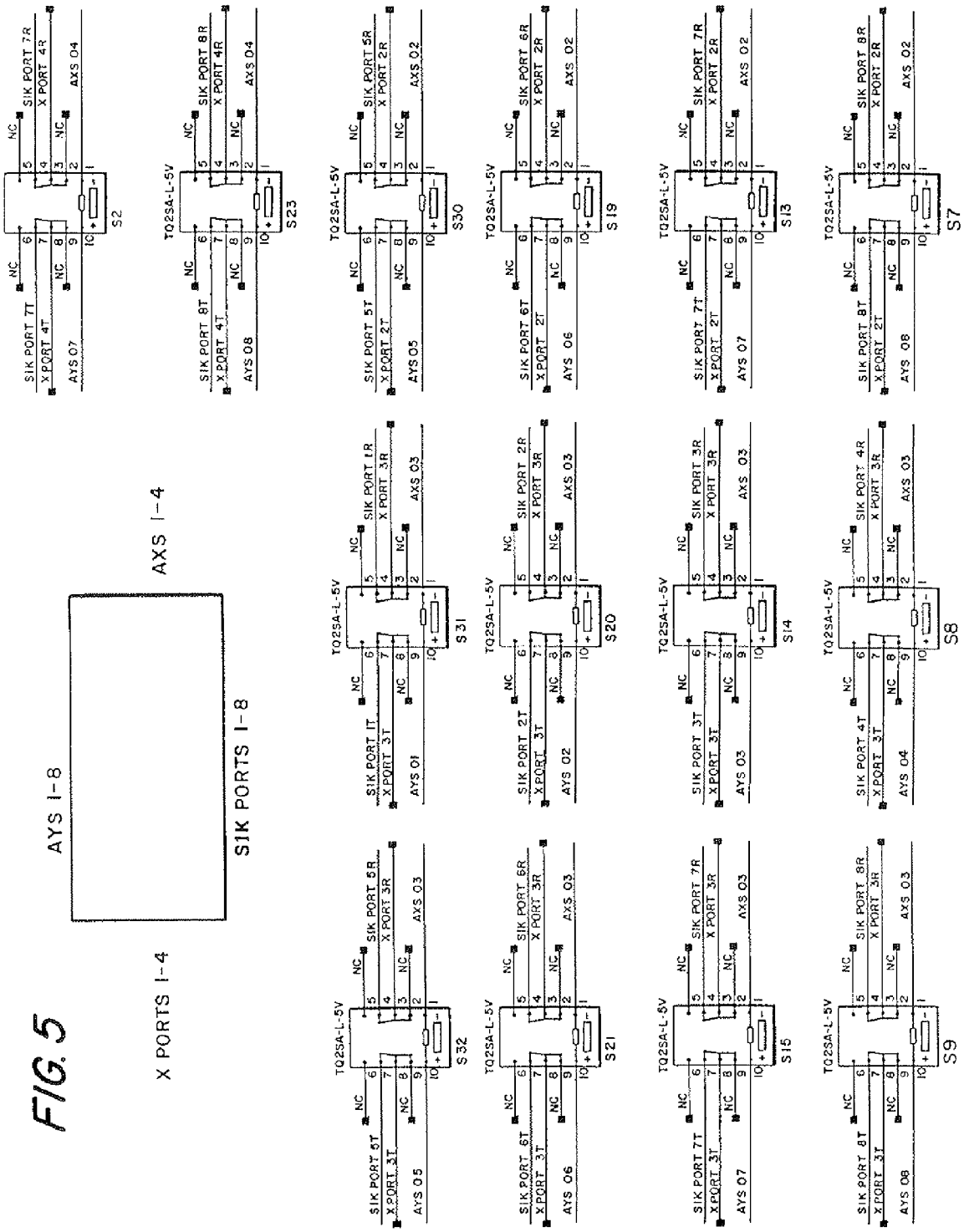
FIGS. 5 and 6 comprise a schematic circuit diagram of an array of 32 switches according to an illustrative embodiment.
Figure 6:
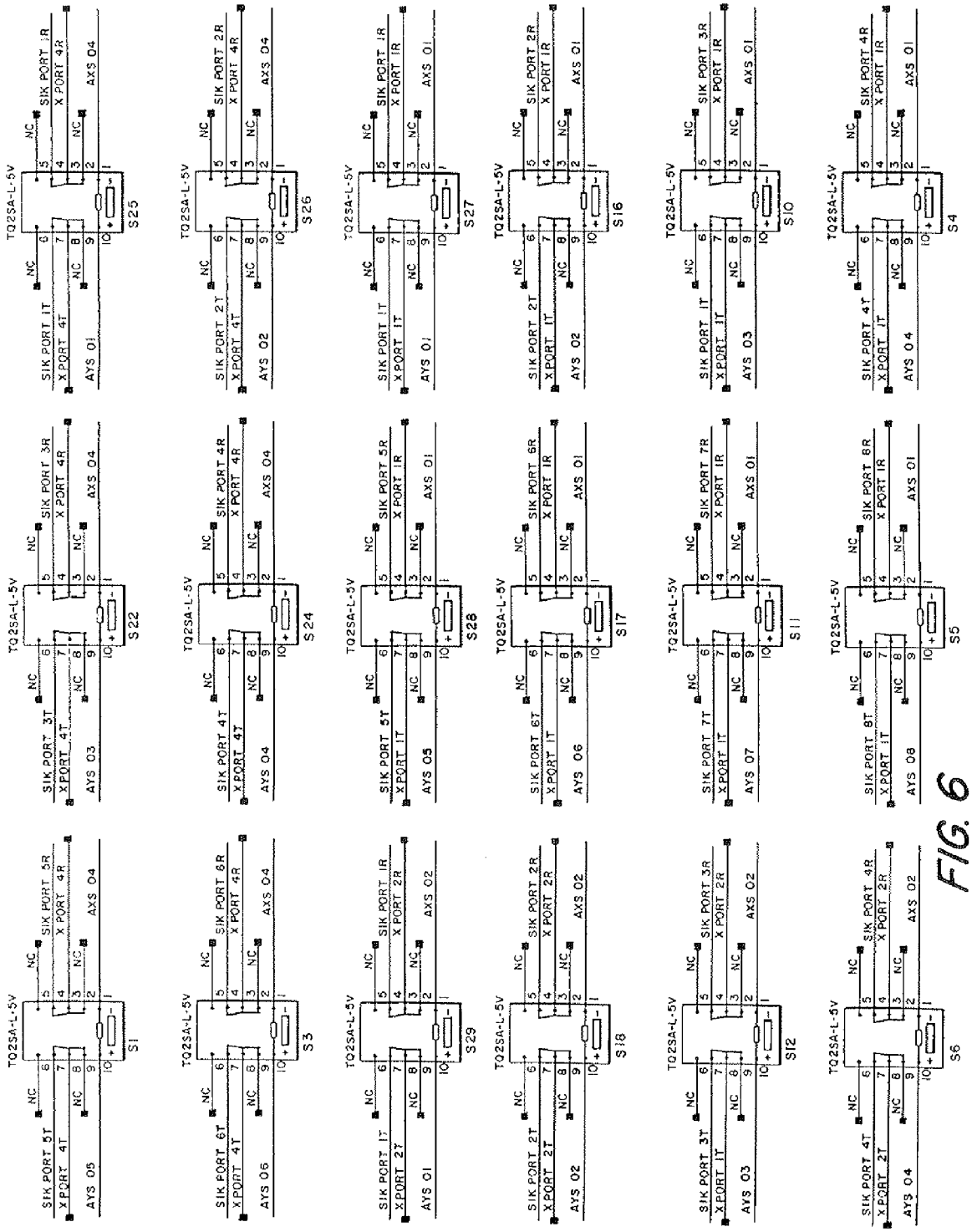

FIGS. 5 and 6 depict an array of 32 switching devices $S_1$, $S_2$, $S_3 \ldots S_{32}$. The particular switching devices depicted are cantilever MEMS switches, but could be other types of switches or relays in other embodiments.

Each of the switches $S_1 \ldots S_{32}$ includes an activation coil (e.g. 21 in FIG. 9), having positive ("Y") and negative ("X") terminals. According to the illustrative embodiment, eight positive terminal drivers and four negative terminal drivers suffice to switch ("close") any selected one of the 32 switching devices $S_1 \ldots S_{32}$. The eight positive drivers produce respective drive signals, AYS_01, AYS_02, AYS_03 . . . AYS_08; while the four negative drivers produce four respective drive signals AXS_01, AXS_02, AXS_03 and AXS_04.

Figure 7:
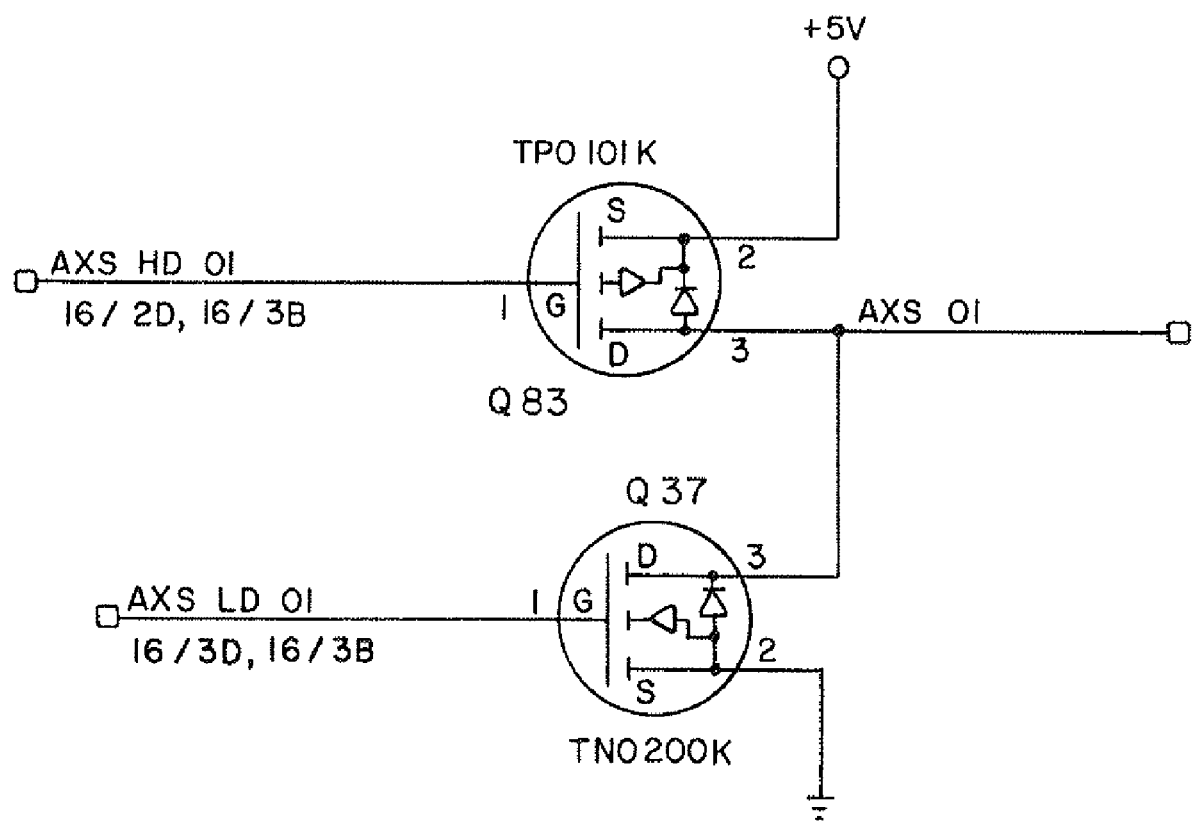
FIGS. 7 and 8 are circuit diagrams of driver circuits for driving switches such as those disclosed in FIGS. 5 and 6.
Figure 8:
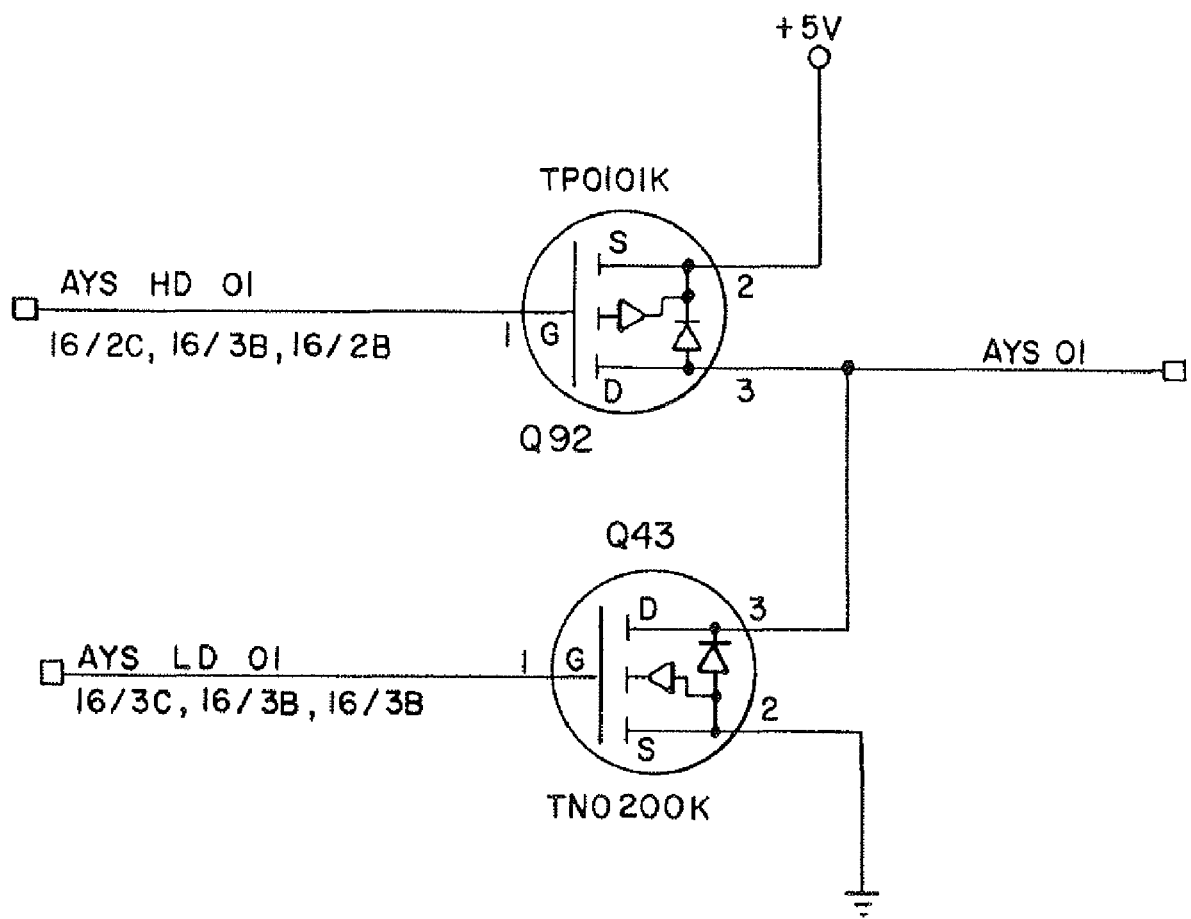

FIGS. 7 and 8 depict a driver circuit for generating drive signals AXS_01 and AYS_01, respectively. These driver circuits may be conventional MOSFET drivers. The driver of FIG. 3 is triggered by gate signals AXS_HD_01 and AXS_LD_01, while that of FIG. 4 is triggered by gates signals AYS_HD_01 and AYS_LD_01.

Figure 9:
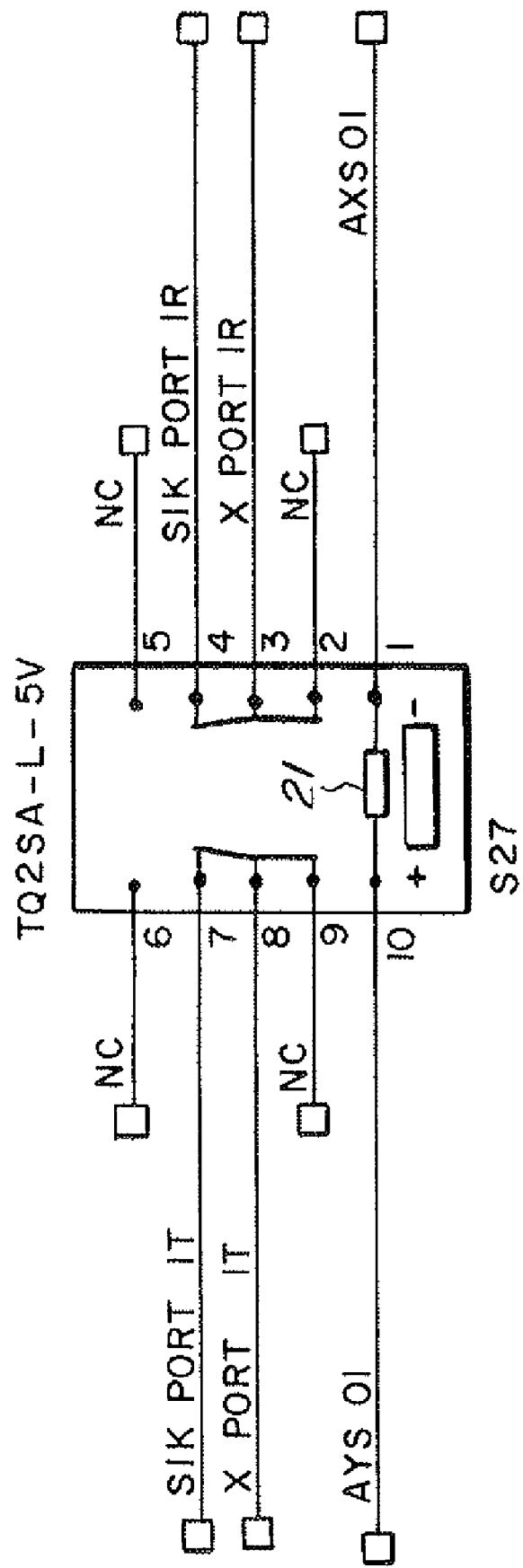
FIG. 9 is an enlarged view of one of the switches of the array shown in FIGS. 5 and 6.

A specific MEMS switching device S27 is shown enlarged in FIG. 9. It may be seen that the coil 21 of this device S27 is driven by drive signals AYS_01 and AXS_01. Pins 7 and 4 are "signal-in" pins and pins 8 and 3 are "signal returns," respectively. The temporary magnetic field created by an energy pulse to the coil 21 starts the respective cantilever $S_{23}$, $S_{24}$ to pull and close the respective signal paths. The cantilevers 23, 24 are held in place by a fixed magnet after the activation pulse to the coil 21 terminates.

Figure 10:
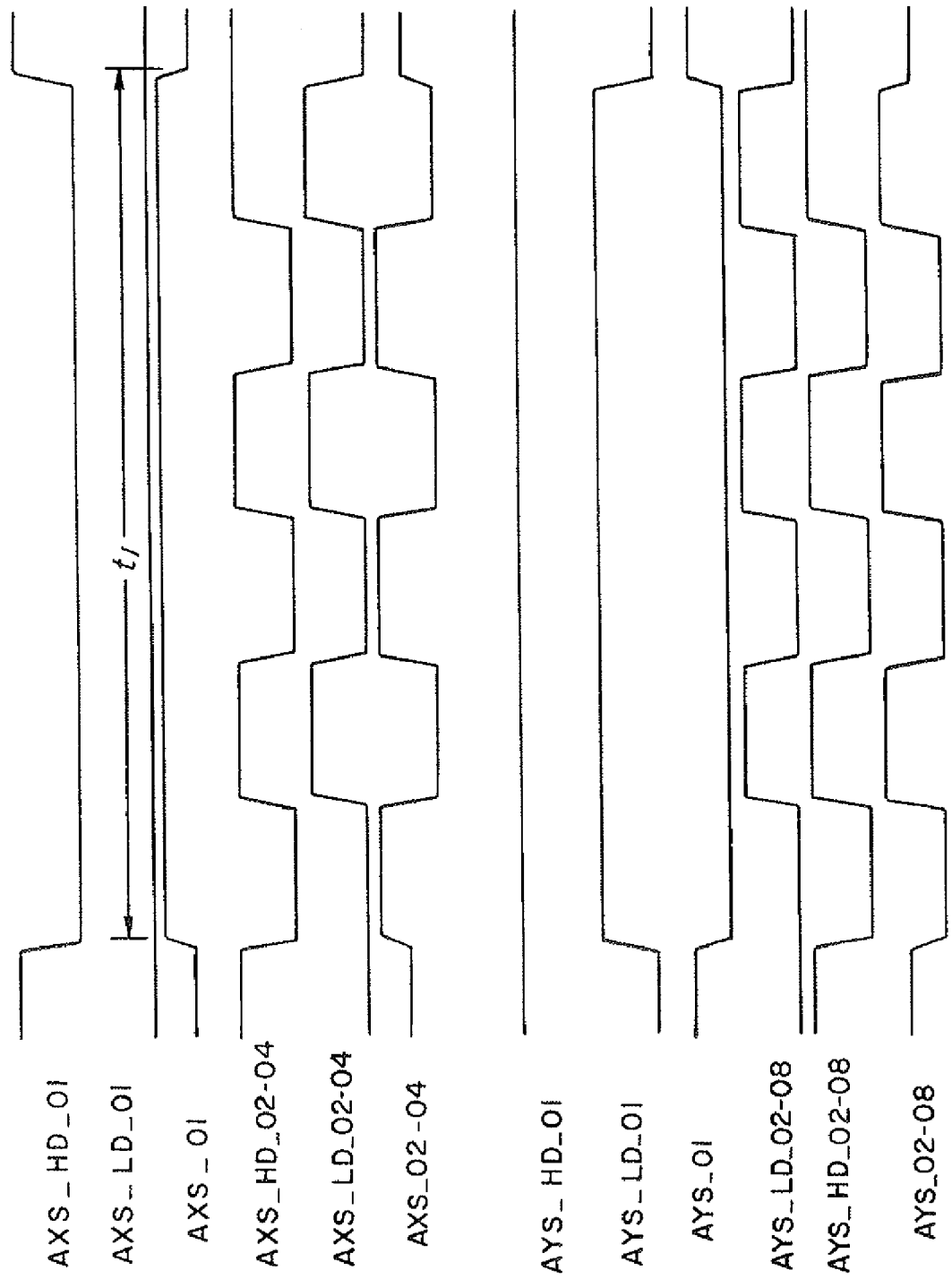
FIGS. 10 and 11 are waveform diagrams useful in illustrating a method for driving switches of the array of FIGS. 1 and 2 with a reduced number of drivers.

FIG. 10 illustrates the pulse waveforms utilized when it is desired to set switch 827, i.e. close cantilevers 23, 24. As may be seen AXS_01 rises to a constant positive voltage level for a time interval t3, which may be for example, 200 microseconds. At the same time AYS_01 drops to a constant negative voltage level over the same interval $t_1$. The other "X" drive signals AXS_02, AXS_03 and AXS_04 are pulsed with a periodic pulse train which alternates between a positive and a negative voltage level. The other "Y" drive signals AYS_02 . . . AYS-08 are driven with a pulse train which may be the same as, but opposite in polarity, to that driving AXS_02-04.

In this manner, only switch S27 is provided with the energy necessary to activate or "close" it, while the pulse modulated energy prevents false triggering of other switching devices in the array. As may be appreciated, three other switches in $S_{25}$, $S_{29}$, $S_{31}$ in the 32 switch array of FIGS. 5 and 6 are driven by the output AYS_01 of the driver circuit shown in FIG. 8. However, each of these other switches receives a respective one of the modulated "X" drive signals AXS_02, AXS_03 and AXS_04, which prevents triggering of these three switches $S_{25}$, $S_{29}$, $S_{31}$.

Figure 11:
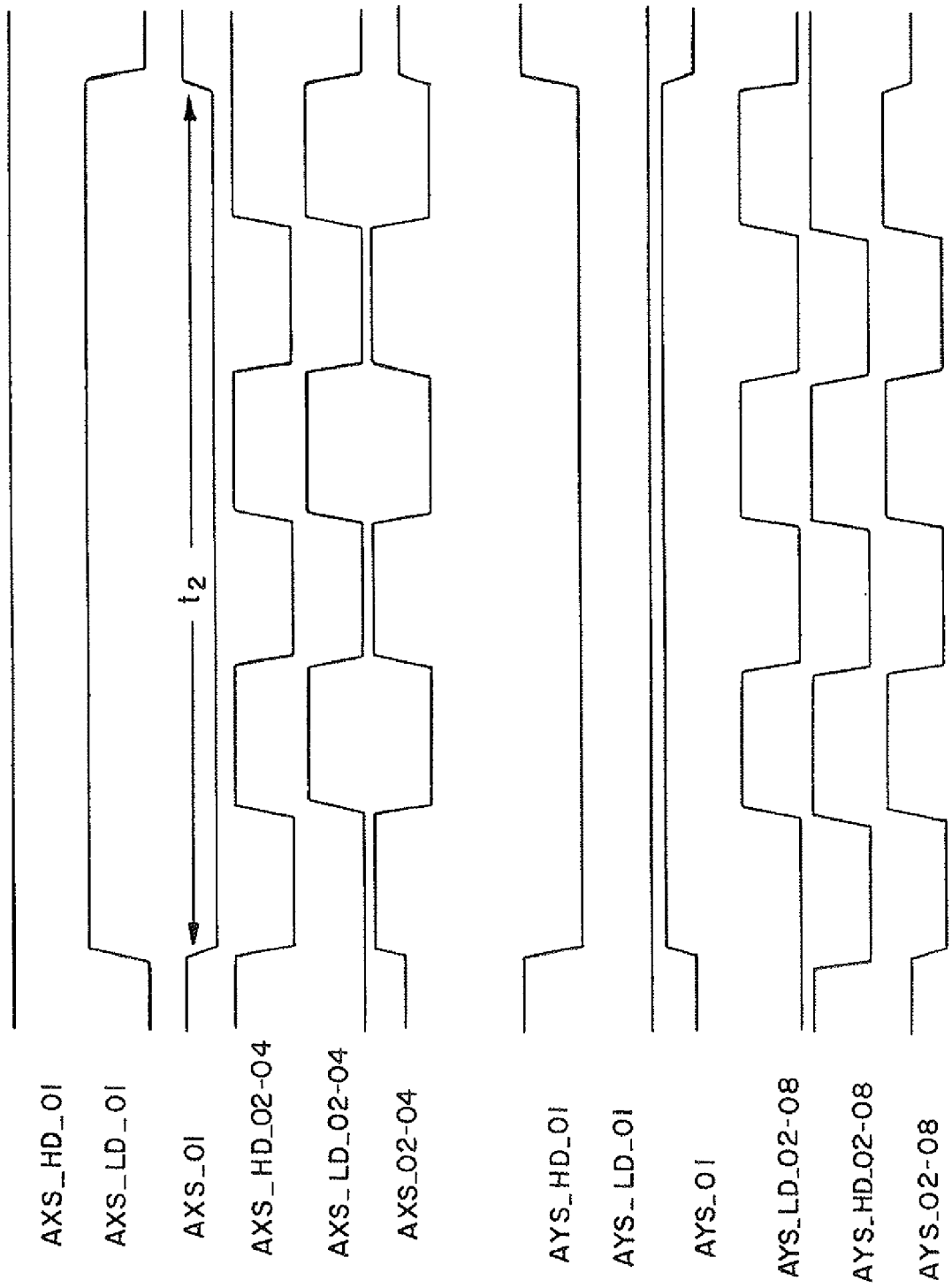

To clear or reset switch $S_{27}$, the energy waveforms depicted in FIG. 11 are used. In this case, AXS_01 comprises a negative pulse of duration $t_2$, while AYS_01 comprises a positive pulse of duration $t_2$. The waveforms for AXS_02-04 and AYS_02-08 are the same as those of FIG. 10; thus achieving the resetting of switch $S_{27}$ without false triggering of other switches in the array.

With respect to switch $S_{27}$, the pulse interval and voltage level supplied by AXS_01 and AYS_01 may be those typically necessary to close the switch. Such levels and durations will typically vary depending on the type of switch used, e.g. MEMS switches or electromechanical relays or solenoids. Additionally, the voltage levels and duty cycle of the pulse modulated waveforms, e.g. AXS_02, AXS_03, AXS_04 in FIG. 10, will vary with the application, but are selected in each application to be sufficient to prevent false triggering of other devices in the array. Waveforms analogous to those shown in FIGS. 10 and 11 are used to set and reset any specific one of the other switches in the 32 switch array. With respect to the array of FIGS. 5 and 6, it may be observed that such an array would conventionally require 4×8+4 (N·M+N)=36 drivers, whereas the illustrative embodiment employs 12 drivers.

Methods according to the illustrative embodiments are effective in addressing EM device arrays that are symmetric (N=M), asymmetric (N>M or N<M), or asymmetric plus non orthogonal (an array composed of multi asymmetric sub arrays with various N or M segments).

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A switching array comprising:
 (a) a plurality of three stage switching arrays; and
 (b) an expansion switching array, wherein a second stage of each of the three stage switching arrays includes an expansion section comprising switches which facilitate interconnection of each three stage array to the expansion switching array;

(c) wherein each of the plurality of three stage switching arrays comprises a first stage array having N inputs and K outputs and a third stage array having K inputs and N outputs, each second stage array of each three stage switching array receiving M local inputs from the first stage array and providing M local outputs to the third stage switching array, each second stage switching array further providing P outputs to the expansion array and receiving P inputs from the expansion array, where K, N, M and P are integers; and (d) wherein the switching array comprises a plurality of nodes and wherein, in each node, there are K second stage arrays, M first stage arrays, and M third stage arrays, and wherein the number of expansion switching arrays in the expansion array is equal to K×P.

2. The array of claim 1 wherein the expansion switching array includes a plurality of square arrays, each having Q inputs and Q outputs and wherein the second stages of the three stage arrays each include 1 ... M+1 ... M+P vertical stages which connect to the square arrays of the expansion switching array.

3. The switching array of claim 1 wherein each expansion switching array is a square array having Q inputs and Q outputs, where Q is an integer.

4. The switching array of claim 1 wherein the expansion switching array comprises a single column of square switching arrays.

5. The array of claim 4 wherein each square array has Q inputs and Q outputs and wherein the second stages of the three stage arrays each include 1 ... M+1 ... M+P vertical stages which connect to the square arrays of the expansion switching array.

6. A switching array comprising:
(a) a plurality of three stage switching arrays; and
(b) an expansion array comprising a plurality of expansion switching arrays;
wherein a second stage array of each three stage switching array includes a plurality of expansion outputs, each connected as an input to a respective expansion switching array and wherein each respective expansion switching array provides a plurality of expansion outputs, each connected as an input back to a respective second stage switching array;

(c) wherein each of the plurality of three stage switching arrays comprises a first stage array having N inputs and K outputs and a third stage array having K inputs and N outputs, each second stage array of each three stage switching array receiving M local inputs from the first stage array and providing M local outputs to the third stage switching array, each second stage switching array further providing P outputs to the expansion array and receiving P inputs from the expansion array, where K, N, M and P are integers; and (d) wherein the switching array comprises a plurality of nodes and wherein, in each node, there are K second stage arrays, M first stage arrays, and M third stage arrays, and wherein the number of expansion switching arrays in the expansion array is equal to K×P.

7. The switching array of claim 6 wherein each expansion switching array is a square array having Q inputs and Q outputs, where Q is an integer.

8. The switching array of claim 6 wherein the expansion array comprises a single column of square switching arrays.

9. The array of claim 8 wherein each square array has Q inputs and Q outputs and wherein the second stages of the three stage arrays each include 1 ... M+1 ... M+P vertical stages which connect to the square arrays of the expansion array.

10. The array of claim 6 wherein the expansion array includes a plurality of square arrays, each having Q inputs and Q outputs and wherein the second stages of the three stage arrays each include 1 ... M+1 ... M+P vertical stages which connect to the square arrays of the expansion array.

* * * * *